United States Patent
Kageyama et al.

(10) Patent No.: US 10,843,509 B2
(45) Date of Patent: Nov. 24, 2020

(54) PNEUMATIC TIRE

(71) Applicant: SUMITOMO RUBBER INDUSTRIES, LTD., Kobe (JP)

(72) Inventors: Naoki Kageyama, Kobe (JP); Mitsuru Sueyoshi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 539 days.

(21) Appl. No.: 15/123,363

(22) PCT Filed: Mar. 20, 2015

(86) PCT No.: PCT/JP2015/058444
§ 371 (c)(1),
(2) Date: Sep. 2, 2016

(87) PCT Pub. No.: WO2015/146823
PCT Pub. Date: Oct. 1, 2015

(65) Prior Publication Data
US 2017/0057295 A1    Mar. 2, 2017

(30) Foreign Application Priority Data

Mar. 26, 2014    (JP) ................. 2014-064406
Sep. 11, 2014    (JP) ................. 2014-185482

(51) Int. Cl.
*B60C 11/01*     (2006.01)
*B60C 11/11*     (2006.01)
(Continued)

(52) U.S. Cl.
CPC .......... *B60C 11/01* (2013.01); *B60C 11/0304* (2013.01); *B60C 11/11* (2013.01);
(Continued)

(58) Field of Classification Search
CPC ..... B60C 11/01; B60C 11/0304; B60C 11/11; B60C 11/1353; B60C 2011/1361; B60C 2011/0358; B60C 2200/14
See application file for complete search history.

(56) References Cited

U.S. PATENT DOCUMENTS

D512,369 S   *   12/2005   Lo ........................... B60C 11/01
                                                                      D12/548
D517,469 S   *   3/2006   Boore ......................... D12/579
(Continued)

FOREIGN PATENT DOCUMENTS

| EP | 1093939 A2 | 4/2001 |
|---|---|---|
| JP | 11-291718 A | 10/1999 |

(Continued)

OTHER PUBLICATIONS

Machine translation of JP2000-280711 (no date).*
(Continued)

*Primary Examiner* — Steven D Maki
*Assistant Examiner* — Philip N Schwartz
(74) *Attorney, Agent, or Firm* — Birch, Stewart, Kolasch & Birch LLP

(57) ABSTRACT

The purpose of the present invention is to improve running performance in rocky areas. Provided is a pneumatic tire in which is formed a shoulder block in which first shoulder blocks and second shoulder blocks are alternately aligned. Each first shoulder block has a first edge that is on the outer side in a tire axial direction of a tread surface of the first shoulder block. Each second shoulder block has a second edge that is positioned on the outer side in the tire axial direction of a tread surface of the second shoulder block and more toward the inner side in the tire axial direction than the first edge.

20 Claims, 12 Drawing Sheets

(51) Int. Cl.
 *B60C 11/03* (2006.01)
 *B60C 11/13* (2006.01)
(52) U.S. Cl.
 CPC ... *B60C 11/1353* (2013.01); *B60C 2011/0358* (2013.01); *B60C 2011/1361* (2013.01); *B60C 2200/14* (2013.01)

(56) References Cited

U.S. PATENT DOCUMENTS

| | | |
|---|---|---|
| D578,956 S | 10/2008 | Dixon et al. |
| 2004/0020577 A1* | 2/2004 | Hirai .................. B60C 11/0318 152/526 |
| 2009/0107600 A1 | 4/2009 | Missik-Gaffney et al. |
| 2013/0139936 A1 | 6/2013 | Ohara |

FOREIGN PATENT DOCUMENTS

| | | | |
|---|---|---|---|
| JP | 2000-280711 A | 10/2000 | |
| JP | 2000280711 A | * 10/2000 | ............. B60C 11/01 |
| JP | 2001-55014 A | 2/2001 | |
| JP | 2004-58839 A | 2/2004 | |
| JP | 2005-67246 A | 3/2005 | |
| JP | 2013-119277 A | 6/2013 | |
| WO | WO 99/52720 A1 | 10/1999 | |

OTHER PUBLICATIONS

Extended European Search Report, dated Jul. 17, 2018, for European Application No. 18166822.9.
Extended European Search Report, dated Oct. 2, 2017, for European Application No. 15769846.5.

* cited by examiner

PNEUMATIC TIRE

TECHNICAL FIELD

The present invention relates to a pneumatic tire capable of improving traveling performance on rocky terrain.

BACKGROUND ART

For example, pneumatic tires for traveling on rocky terrain such as rocky hills are required to have traveling performance (drivability) on rocky terrain to exert sufficient traction and braking force. In order to improve the traveling performance on rocky terrain, the tires usually employ a tread portion provided with a plurality of blocks. Such a pneumatic tire can improve the traveling performance on rocky terrain since adjacent blocks hold rocks to improve traction and braking force.

However, a pneumatic tire with further improved traveling performance on rocky terrain has been demanded in recent years.

CITATION LIST

Patent Literature

Patent Literature 1: Japanese Unexamined Patent Application Publication No. 2005-67246
Patent Literature 2: Japanese Unexamined Patent Application Publication No. 2013-119277

SUMMARY OF INVENTION

Technical Problem

The present invention has been made in view of the circumstances described above, and has a major object to provide a pneumatic tire capable of improving traveling performance on rough terrain covered with rocks by basically modifying a shape of shoulder blocks.

Solution to Problem

The present invention provides a pneumatic tire including a tread portion being provided with a shoulder block row including a plurality of circumferentially arranged shoulder blocks on at least one side of tread edges, the shoulder blocks including a first shoulder block and a second shoulder block alternately arranged in a circumferential direction of the tire, the first shoulder block including a first edge defining an axially outermost ground contact edge of its ground contact surface, and the second shoulder block including a second edge defining an axially outermost ground contact edge of its ground contact surface, the second edge being located axially inwardly of the first edge.

In the pneumatic tire according to the invention, it is preferable that the first shoulder block is provided with a first lug groove extending axially inwardly from the first edge and terminating within the block.

In the pneumatic tire according to the invention, it is preferable that the first lug groove includes an axial portion extending from the first edge along an axial direction of the tire and an inclined portion connected to the axial portion and having an angle of from 10 to 15 degrees with respect to the axial direction of the tire.

In the pneumatic tire according to the invention, it is preferable that the first edge is apart from the second edge at an axial distance of from 4% to 7% of a tread width.

In the pneumatic tire according to the invention, it is preferable that the second shoulder block is provided with a second lug groove extending axially inwardly from the second edge and terminating within the block.

In the pneumatic tire according to the invention, it is preferable that the second lug groove consists of an inclined portion extending axially inwardly from the second edge at an angle of not more than 15 degrees with respect to an axial direction of the tire.

In the pneumatic tire according to the invention, it is preferable that the first shoulder block is provided with a first lug groove extending axially inwardly from the first edge and terminating within the block, and that an axially inner end of the second lug groove is provided at the same location as an axially inner end of the first lug groove in an axial direction of the tire.

In the pneumatic tire according to the invention, it is preferable that the second shoulder block includes a side surface extending radially inwardly and axially outwardly from the second edge, and that the side surface of the second shoulder block is configured to a concave arc surface having a center located outside the tire.

In the pneumatic tire according to the invention, it is preferable that a height of the side surface of the second shoulder block at the tread edge is in a range of from 30% to 50% a height of the shoulder blocks.

In the pneumatic tire according to the invention, it is preferable that the tire further includes a buttress surface which is a radially outward region of a sidewall portion, in a tire meridian cross-sectional view including a tire rotational axis under a standard condition such that the tire is mounted on a standard wheel rim with a standard pressure, but is loaded with no tire load. The buttress surface is preferably provided with a plurality of circumferentially arranged projections protruding axially outwardly. The projections preferably include a first projection having a circumferential width decreasing smoothly toward radially inwardly. The second shoulder block preferably includes a side surface extending radially inwardly and axially outwardly from the second edge, and the first projection is preferably connected to the second edge through the side surface of the second shoulder block.

In the pneumatic tire according to the invention, it is preferable that the projections further include a second projection having a circumferential width increasing smoothly toward radially inwardly, and that the first projection and the second projection are arranged alternately in the circumferential direction of the tire.

In the pneumatic tire according to the invention, it is preferable that the second projection includes a circumferentially extending outer surface facing radially outwardly, and that the second projection is connected to the first edge through an outer surface of the first shoulder block.

In the pneumatic tire according to the invention, it is preferable that in a tire meridian cross-sectional view including a tire axis, the outer surface of the first shoulder block is configured to a convex shape toward axially outwardly, or a straight shape.

In the pneumatic tire according to the invention, it is preferable that a radially inner portion of the second projection is separated into two.

In the pneumatic tire according to the invention, it is preferable that the projections include a pair of radially extending longitudinal edges, and that angles of the longitudinal edges are in a range of from 8 to 12 degrees with respect to a radial direction of the tire.

In the pneumatic tire according to the invention, it is preferable that protruding heights of the projections are in a range of from 5 to 9 mm.

In the pneumatic tire according to the invention, it is preferable that radially inner ends of the projections are located in a range of from 60% to 70% a tire sectional height from a bead base line.

Advantageous Effects of Invention

The pneumatic tire in accordance with the present invention includes the shoulder blocks that include the first shoulder block and the second shoulder block arranged alternately. The first shoulder block includes a first edge defining an axially outermost ground contact edge of its ground contact surface. The second shoulder block includes a second edge located axially inwardly of the first edge. Such a pneumatic tire can hold a rock on rocky terrain in a space among a pair of first shoulder blocks and a second shoulder block arranged therebetween. Thus, the pneumatic tire in accordance with the present embodiment exerts excellent traveling performance on rocky terrain.

DESCRIPTION OF EMBODIMENTS

Figure 1:
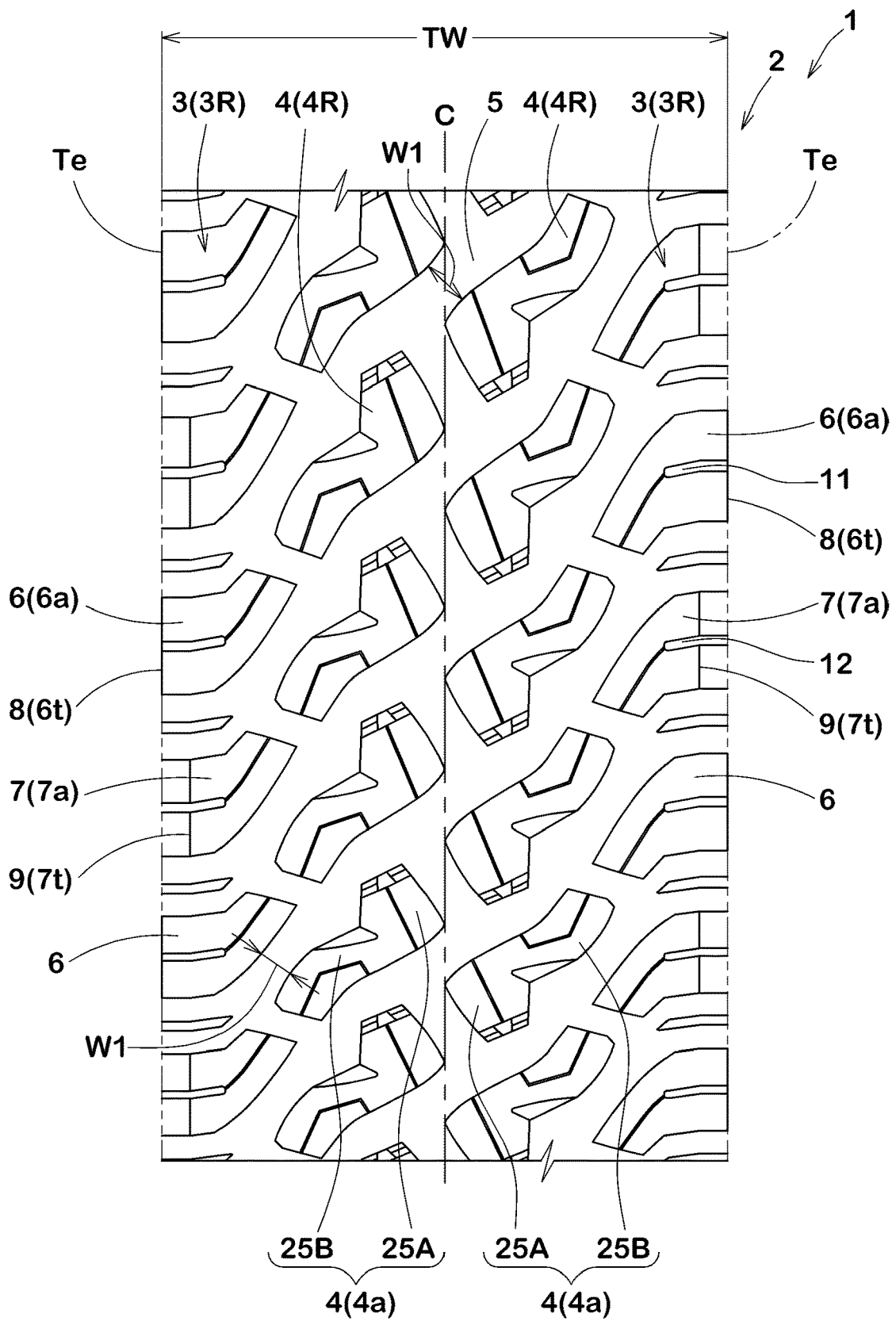
FIG. 1 is a development view of a tread portion of a pneumatic tire in accordance with an embodiment of the present invention.

An embodiment of the present invention will be explained below with reference to the accompanying drawings. FIG. 1 illustrates a development view of a tread portion 2 of a pneumatic tire 1 in accordance with an embodiment of the present invention. The pneumatic tire (hereinafter, simply referred to as "tire") 1 in accordance with the present embodiment, for example, may be suitably used for an all season tire for four-wheel-drive vehicles.

In this embodiment, the tread portion 2 is provided with a pair of shoulder block rows 3R including a plurality of circumferentially arranged shoulder blocks 3 on both sides of tread edges Te, a pair of central block rows 4R including a plurality of circumferentially arranged central blocks 4 on both sides of the tire equator C, and grooves 5 formed around the shoulder blocks 3 and the central blocks 4.

The tread edges Te are axially outer most edges of a ground contact patch of the tire which occurs under a standard condition with a standard tire load, wherein the standard condition is such that the tire is mounted on a standard wheel rim with a standard pressure, but is loaded with no tire load. An axial distance between the tread edges Te and Te under the standard condition is defined as the tread width TW. Unless otherwise noted, various dimensions, positions and the like of the tire refer to those measured under the standard condition.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tires, however, the standard pressure is uniformly defined by 180 kPa.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load.

When groove widths W1, each of which is measured in a direction perpendicular to a groove centerline, of the grooves 5 are small, traveling performance on rocky terrain may be deteriorated since the shoulder blocks 3 or the central blocks 4 cannot hold a projection of a rock. When groove widths W1 are large, uneven wear resistance may be deteriorated since rigidity of each block 3 and 4 may be lower. Preferably, groove widths W1 of grooves 5 are in a range of from 5% to 15% the tread width TW.

Figure 2:
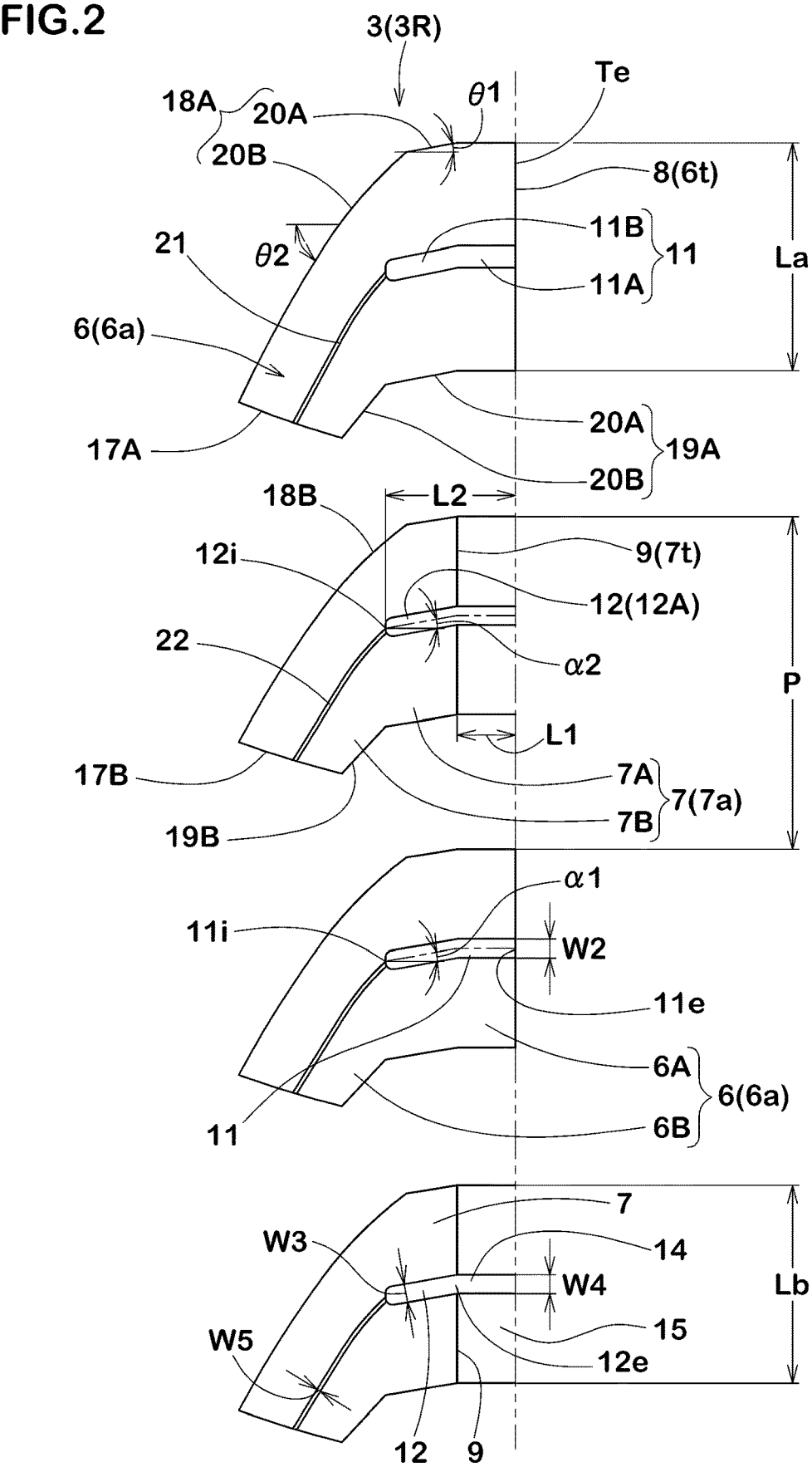
FIG. 2 is an enlarged view of shoulder blocks of FIG. 1.

FIG. 2 illustrates an enlarged view of shoulder blocks 3 of FIG. 1. As illustrated in FIG. 2, the shoulder blocks 3 according to the embodiment include first shoulder blocks 6 and second shoulder blocks 7. The shoulder blocks 6 and 7 are arranged alternately in the circumferential direction of the tire.

In this embodiment, the first shoulder blocks 6 include a ground contact surface 6a that includes a rectangular outer portion 6A and an approximately arc-shaped inner portion 6B located axially inward of the outer portion 6A. Note that the first shoulder blocks 6 are not limited to such a shape.

Each of the first shoulder blocks 6 includes a first edge 8 defining an axially outermost ground contact edge 6t of its ground contact surface 6a. In this embodiment, the first edge 8 extends straightly to form the tread edge Te. Thus, it is possible to ensure a large volume of the first shoulder blocks 6 to improve uneven wear resistance.

In this embodiment, each of the second shoulder blocks 7 includes a ground contact surface 7a that includes a rectangular outer portion 7A and an approximately arc-shaped inner portion 7B located axially inward of the outer portion 7A. Note that the second shoulder blocks 7 are not limited to such a shape.

Each of the second shoulder blocks 7 includes a second edge 9 defining an axially outermost ground contact edge 7t of its ground contact surface 7a. The second edge 9 extends along the circumferential direction of the tire.

Figure 3:
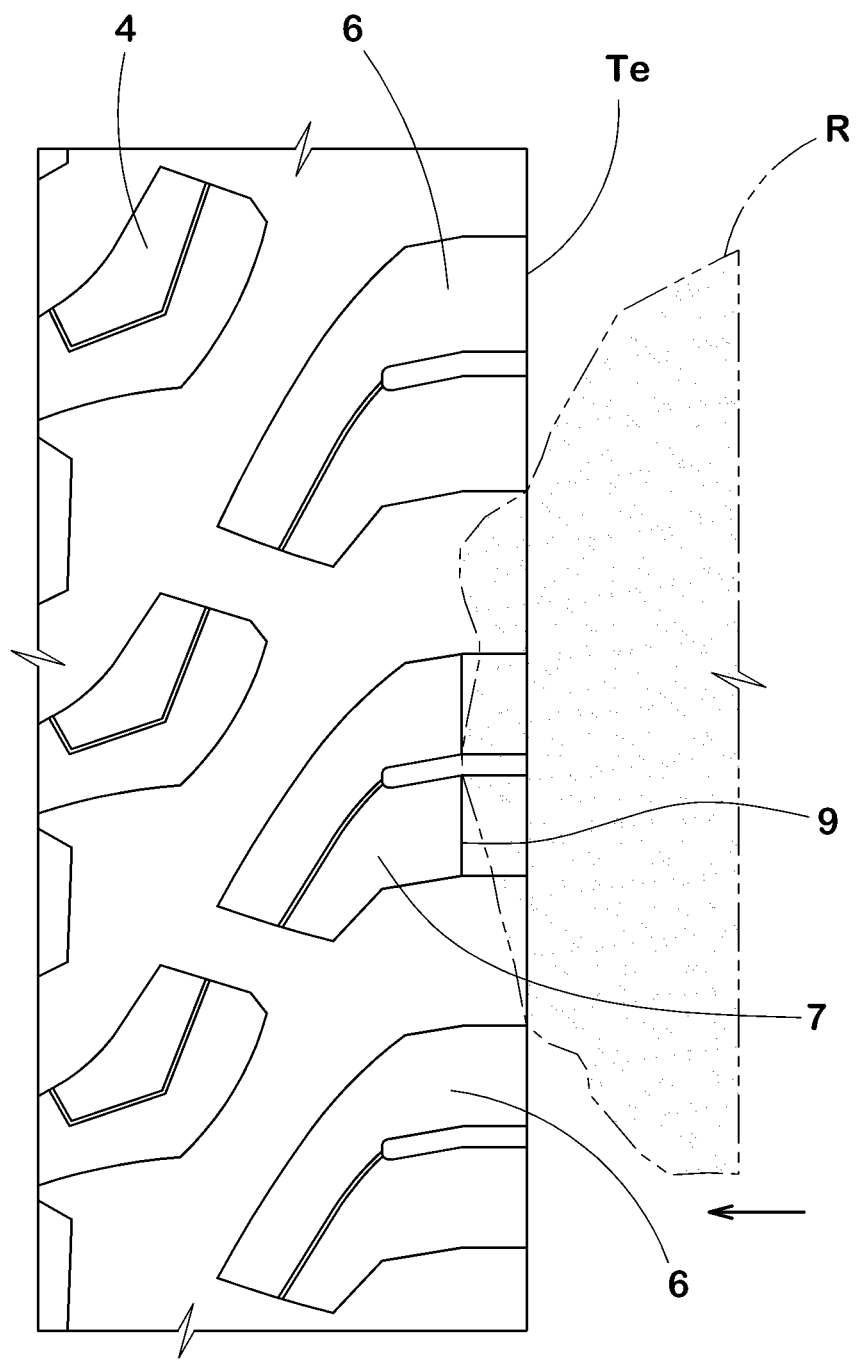
FIG. 3 is a plan view of shoulder blocks for explaining an action of holding a rock.

The second edges 9 are located axially inwardly of the first edges 8. Thus, as illustrated in FIG. 3, a pair of adjacent first shoulder blocks 6 and 6 and the second edge 9 of the second shoulder block 7 arranged therebetween can hold a rock R using these side surfaces. Accordingly, the tire 1 in accordance with the present embodiment exerts large traction and braking force to offer an excellent traveling performance on rocky terrain.

As illustrated in FIG. 2, the first edges 9 are preferably apart from the second edges 8 at an axial distance L1 of from 4% to 7% of the tread width TW. When the distance L1 is less than 4% the tread width TW, it may be difficult to hold a rock effectively. When the distance L1 is more than 7% the tread width TW, uneven wear resistance may be deteriorated since rigidity of the second shoulder blocks 7 become lower.

As illustrated in FIG. 2, circumferential pitches P of the shoulder blocks 3 are preferably in a range of from 20% to 40% the tread width TW. Thus, the above mentioned traveling performance on rocky terrain and uneven wear resistance can be improved in good balance.

Each of the first shoulder blocks 6 is provided with a first lug groove 11 extending axially inwardly from the first edge 8 and terminating within the block. The first lug groove 11 lowers rigidity of the first shoulder block 6 effectively so that the first shoulder block 6 can deform in the circumferential direction of the tire upon receiving ground contact pressure. Accordingly, the tire 1 according to the embodiment can firmly hold a rock between adjacent first shoulder blocks 6 and 6 on both shoulder block rows, thereby further improving traveling performance on rocky terrain.

In this embodiment, each first lug groove 11 includes an axial portion 11A extending from the first edge 8 along the axial direction of the tire and an inclined portion 11B connected to the axial portion 11A and having an angle $\alpha 1$ of from 10 to 15 degrees with respect to the axial direction of the tire. The axial portion 11A and the inclined portion 11B may deform the first shoulder block 6 largely in the circumferential direction of the tire while ensuring axial rigidity thereof. Thus, uneven wear resistance as well as the traveling performance on rocky terrain can further be improved in good balance. Furthermore, since the axial portion 11A is disposed axially outwardly of the inclined portion 11B, the axial rigidity of the first shoulder block 6 on the side of the tread edge Te, which is apt to receive large lateral force upon cornering, can further be improved. In this embodiment, both the axial portion 11A and the inclined portion 11B extend straightly.

Each of the second shoulder blocks 7 is provided with a second lug groove 12 extending axially inwardly from the second edge 9 and terminating within the block.

The second lug groove 12 lowers rigidity of the second shoulder block 7 effectively so that the second shoulder block 7 can deform in the circumferential direction of the tire upon receiving ground contact pressure. Accordingly, the tire 1 according to the embodiment can firmly hold a rock between adjacent first shoulder blocks 6 and 6 on both shoulder block rows, thereby further improving traveling performance on rocky terrain.

In this embodiment, the second lug groove 12 consists of an inclined portion 12A extending axially inwardly from the second edge 9 at an angle $\alpha 2$ of not more than 15 degrees with respect to the axial direction of the tire. The second lug groove 12 ensures high axial rigidity of the second shoulder block 7 on the axially outer side of the tire, thereby improving uneven wear resistance.

The axially inner ends 12i of the second lug grooves 12 are provided at the same locations as the axially inner ends 11i of the first lug grooves 11 in the axial direction of the tire. Thus, the respective rigidity of the first shoulder blocks 6 and the second shoulder blocks 7 are balanced to improve uneven wear resistance.

The axial distances L2 between the axially inner ends 11i of the first lug grooves 11 and the tread edge Te as well as the axially inner ends 12i of the second lug grooves 12 and the tread edge Te are preferably in a range of from 10% to 20% the tread width TW. When the distances L2 are less than 10% the tread width TW, deformation of the first shoulder blocks 6 and the second shoulder blocks 7 may be restricted and it may be difficult to hold a rock in them. When the distances L2 are more than 20% the tread width TW, rigidity of the first shoulder blocks 6 and the second shoulder blocks 7 becomes lower, and uneven wear resistance may be deteriorated.

The axially outer ends 11e of the first lug grooves 11 and the axially outer ends 12e of the second lug grooves 12 are respectively connected to circumferential center locations of the first edges 8 and circumferential center locations of the second edges 9. This ensures a good rigidity balance between the first shoulder blocks 6 and the second shoulder blocks 7 and can further improve uneven wear resistance. Note that the above mentioned circumferential center locations are the middle locations of the first edges 8 and the second edges 9 having circumferential lengths La and Lb in a range of from 40% to 60% of the first edge 8 and the second edge 9, respectively.

Preferably, the groove widths W2 of the first lug grooves 11 are in a range of from 3.0 to 8.0 mm. When the groove widths W2 of the first lug grooves 11 are more than 8.0 mm, rigidity of the first shoulder blocks 6 become lower and uneven wear resistance may be deteriorated. When the groove widths W2 of the first lug grooves 11 are less than 3.0 mm, deformation of the first shoulder blocks 6 tend to be small so as not to be able to hold a rock effectively, and thus it may be difficult to improve the traveling performance on rocky terrain. From the same point of view, the groove widths W3 of the second lug grooves 12 are preferably in a range of from 3.0 to 8.0 mm. In this embodiment, the first lug grooves 11 and the second lug grooves 12 respectively extend in constant groove widths W2 and W3.

In order to provide the above mentioned effects satisfactory, the groove depths (not illustrated) of the first lug grooves 11 and the second lug grooves 12 are preferably in a range of from 1 to 4 mm.

Figure 4:
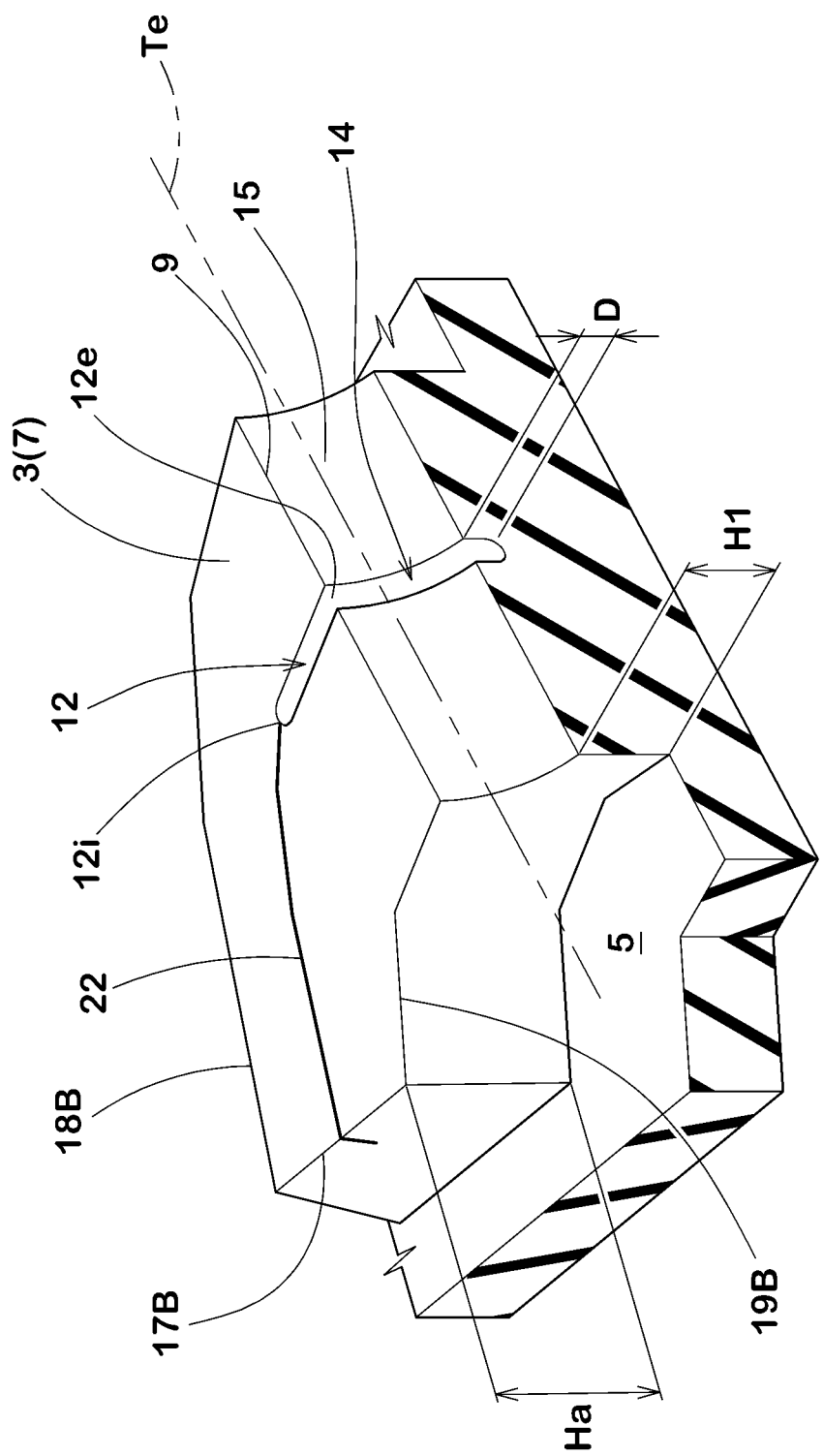
FIG. 4 is a perspective view of a second shoulder block.

FIG. 4 illustrates a perspective view of one of the second shoulder blocks 7 cut along the tread edge Te. As illustrated in FIG. 4, the second shoulder block 7 includes a side surface 15 extending radially inwardly from the second edge 9 toward axially outwardly.

In this embodiment, the side surface 15 of the second shoulder block 7 is configured to a concave arc surface having a center located outside the tire. Since such a side surface 15 of the second shoulder block 7 provides a large space for holding a rock between adjacent first shoulder blocks 6 and 6, the traveling performance on rocky terrain can further be improved. Note that the side surface 15 may be configured to an arc surface having a single radius of curvature or an arc having a plurality of different radii of curvature which are smoothly connected with each other.

Preferably, a height H1 of the side surface 15 of the second shoulder block 7 at the tread edge Te is in a range of from 30% to 50% a height of the shoulder blocks Ha. When the height H1 of the side surface 15 of the second shoulder block 7 is less than 30% the height Ha of the shoulder blocks 3, uneven wear resistance may be deteriorated since rigidity of an axially outer portion of the second shoulder block 7, which is apt to receive large lateral force, becomes excessively low. When the height H1 of the side surface 15 of the second shoulder block 7 is more than 50% the height Ha of the shoulder blocks 3, it may be difficult to improve the traveling performance on rocky terrain since the above mentioned large space may not be able to provide. Note that the height Ha of the shoulder blocks 3 is preferably in a range of from 12 to 18 mm.

In this embodiment, the side surface 15 of the second shoulder block 7 is provided with a narrow groove 14 extending axially outwardly from the second edge 9. The narrow groove 14 reduces the rigidity of the second shoulder block 7 effectively so that the second shoulder block 7 can easily deform toward axially inwardly. Thus, the traveling performance on rocky terrain can be improved.

The narrow groove 14 is connected to the axially outer end 12e of the second lug groove 12. Furthermore, the narrow groove 14 extends along the axial direction of the tire. Thus, it can prevent excessive reduction of rigidity in the second shoulder block 7 so as to ensure uneven wear resistance in a high level.

As illustrated in FIG. 2, the narrow groove 14 preferably has a groove width W4 same as the second lug groove 12, and the groove width W4 is in a range of from 3.0 to 8.0 mm. Similarly, the depth D (illustrated in FIG. 4) of the narrow groove 14 is preferably same as the depth of the second lug groove 12, and the depth D is of from 1 to 4 mm.

Each of the first shoulder blocks 6 further includes a first inner edge 17A, a first long-inclined edge 18A and a first short-inclined edge 19A. The first inner edge 17A is positioned at axially innermost location of the ground contact surface 6a. The first long-inclined edge 18A connects one of the circumferential ends of the first edge 8 to one of the circumferential ends of the first inner edge 17A. The first short-inclined edge 19A connects the other one of the circumferential ends of the first edge 8 to the other one of the circumferential ends of the first inner edge 17A. The first long-inclined edge 18A and the first short-inclined edge 19A are inclined in an opposite direction to the first inner edge 17A in the circumferential direction of the tire.

Each of the first long-inclined edge 18A and the first short-inclined edge 19A includes a gentle inclined portion 20A that extends from the first edge 8 at an angle θ1 of not more than 15 degrees relative to the axial direction of the tire and a steep inclined portion 20B that extends at an angle θ2 of more than 15 degrees relative to the axial direction of the tire. The gentle inclined portion 20A increase axial rigidity of a portion of the shoulder blocks 6 and 7 on the side of the tread edge Te, which is apt to receive larger lateral force, so that uneven wear resistance can further be improved. Furthermore, the gentle inclined portion 20A may be useful to hold a rock effectively.

Similarly, each of the second shoulder blocks 7 further includes a second inner edge 17B, a second long-inclined edge 18B and a second short-inclined edge 19B. The second inner edge 17B is positioned at axially innermost location of the ground contact surface 7a. The second long-inclined edge 18B connects one of the circumferential ends of the second edge 9 to one of the circumferential ends of the second inner edge 17B. The second short-inclined edge 19B connects the other one of the circumferential ends of the second edge 9 to the other one of the circumferential ends of the second inner edge 17B.

In this embodiment, the ground contact surface 6a of each first shoulder block 6 has substantially the same shape as the ground contact surface 7a of each second shoulder blocks 7 except locations of the first edges 8 and the second edges 9. Thus, the rigidity of the first shoulder blocks is balanced with the rigidity of the second shoulder blocks so that an excellent uneven wear resistance is obtained.

Each first shoulder block 6 is provided with a first sipe 21 connecting the axially inner end 11i of the first lug groove 11 and the first inner edge 17A. Similarly, each second shoulder block 7 is provided with a second sipe 22 connecting the axially inner end 12i of the second lug groove 12 and the second inner edge 17B. The sipes 21 and 22 can facilitate deformation of the respective first shoulder blocks 6 and second shoulder blocks 7, thereby improving the traveling performance on rocky terrain.

The first sipe 21 and the second sipes 22 respectively extend substantially in parallel with the first long-inclined edge 18A and the second long-inclined edge 18B. Thus, uneven wear resistance can be obtained without reducing the rigidity of each first shoulder block 6 and each second shoulder block 7.

The first sipe 21 and the second sipe 22 are respectively connected at middle locations of the inner edges 17A and 17B. The middle locations have lengths in a range of from 40% to 60% of the respective inner edges 17A and 17B. Thus, the above mentioned actions can be achieved effectively.

In this specification, the first sipe 21 and the second sipe 22 are defined as one that has a smaller width W5 than widths W2 and W3 of the respective lug grooves 11 and 12. In order to further improve the above mentioned actions, the widths W5 of the first sipe 21 and the second sipe 2 are preferably less than 1.0 mm.

Figure 5:
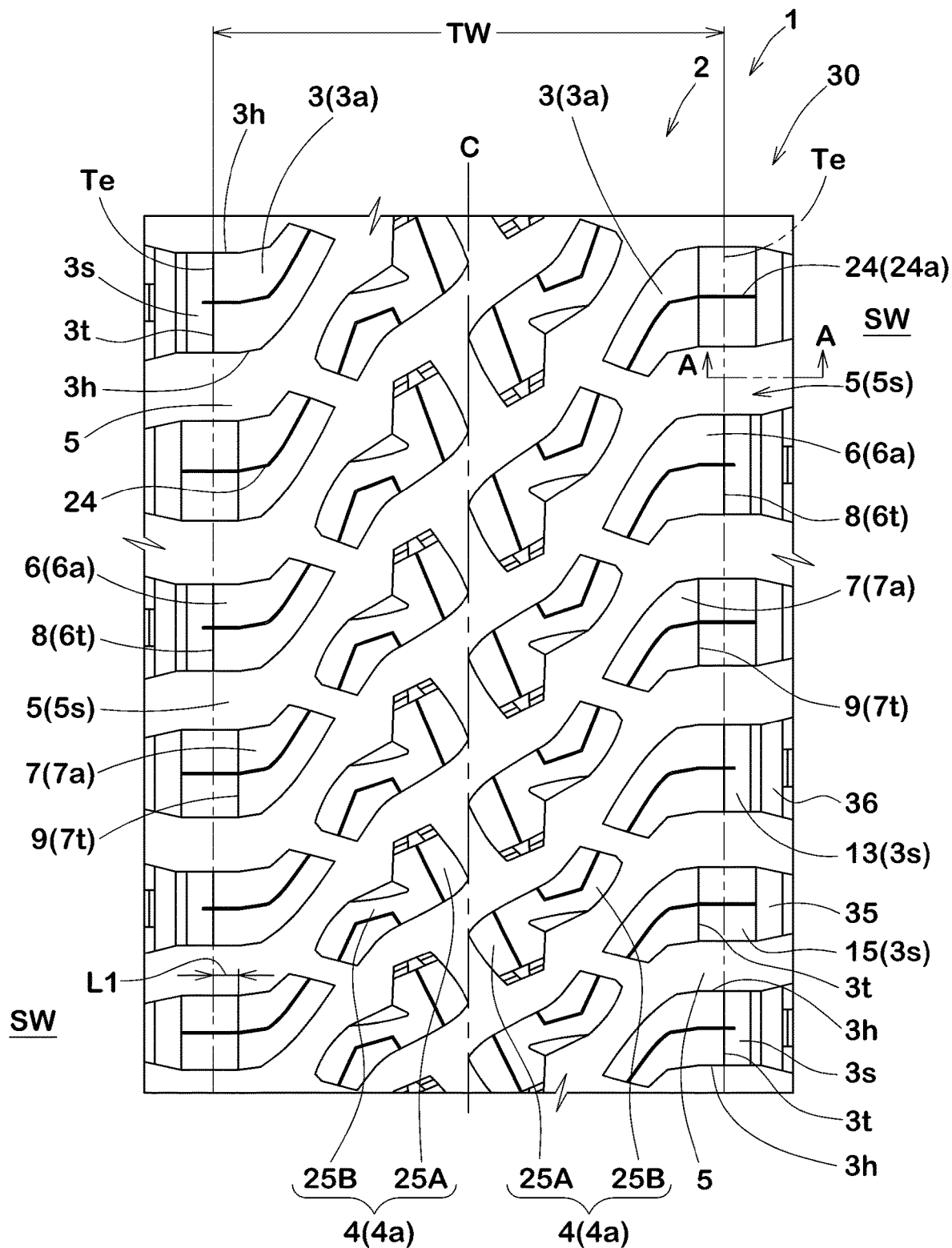
FIG. 5 is a development view of a tread portion of a pneumatic tire in accordance with another embodiment of the present invention.
Figure 6:
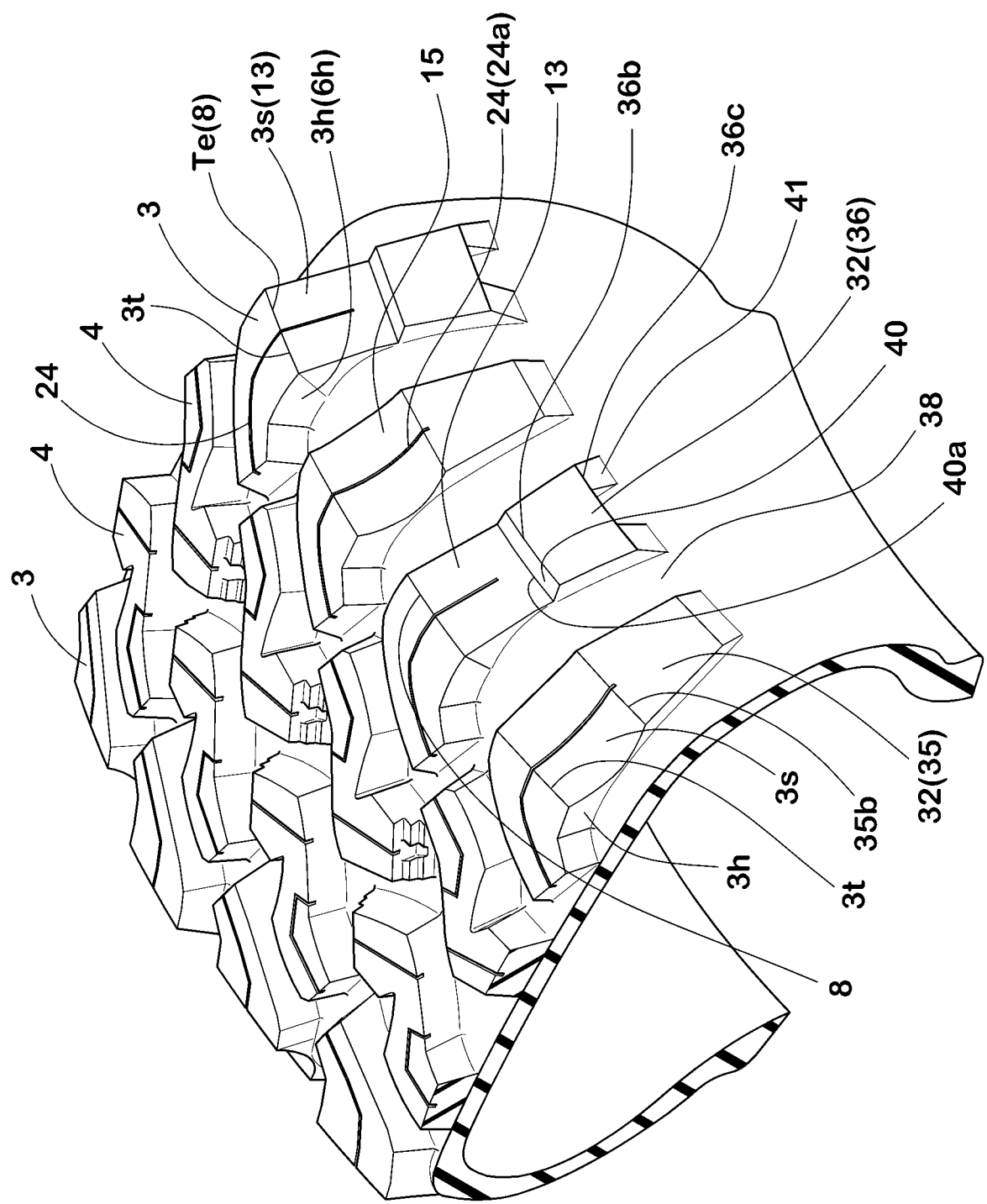
FIG. 6 is a perspective view of the tire of FIG. 5.

FIG. 5 illustrates a development view of the tread portion 2 in accordance with another embodiment. FIG. 6 is a partial perspective view of the tire of FIG. 5. Note that the same references are denoted the same tire elements as the tire 1 of the embodiment illustrated in FIG. 1 and the description will be omitted.

As illustrated in FIG. 5 and FIG. 6, the shoulder blocks 3 include side surfaces 3s inclining axially outwardly and radially inwardly from the axially outermost ground contact ends 3t and wall surfaces 3h to form grooves 5 between circumferential adjacent shoulder blocks 3 and 3. The side surfaces 3s include side surfaces 13 of the first shoulder blocks 6 and side surfaces 15 of the second shoulder blocks 7.

In a tire meridian cross-sectional view, the side surfaces 13 of the first shoulder blocks 6 are preferably configured to a straight shape. This enables to hold a rock effectively between circumferential adjacent first shoulder blocks 6 and 6 since a large area of the wall surfaces 6h is ensured. In view of further improving such an effect, the side surfaces 13 of the first shoulder blocks 6 may be configured to a convex shape protruding toward outside the tire.

In this embodiment, each of the shoulder blocks 3 is provided with a sipe 24 that extends in the axial direction of the tire so as to cross the axially outermost ground contact edge 3t. In this aspect, the rigidity of the shoulder blocks 3 is effectively reduced, and therefore circumferential deformation of the first shoulder blocks 6 as well as axial deformation of the second shoulder blocks 7 toward inside is facilitated so as to hold a rock easily. From this point of view, a sipe 24a on each second shoulder block 7 fully extends over the side surface 15 of the second shoulder block 7.

Figure 7:
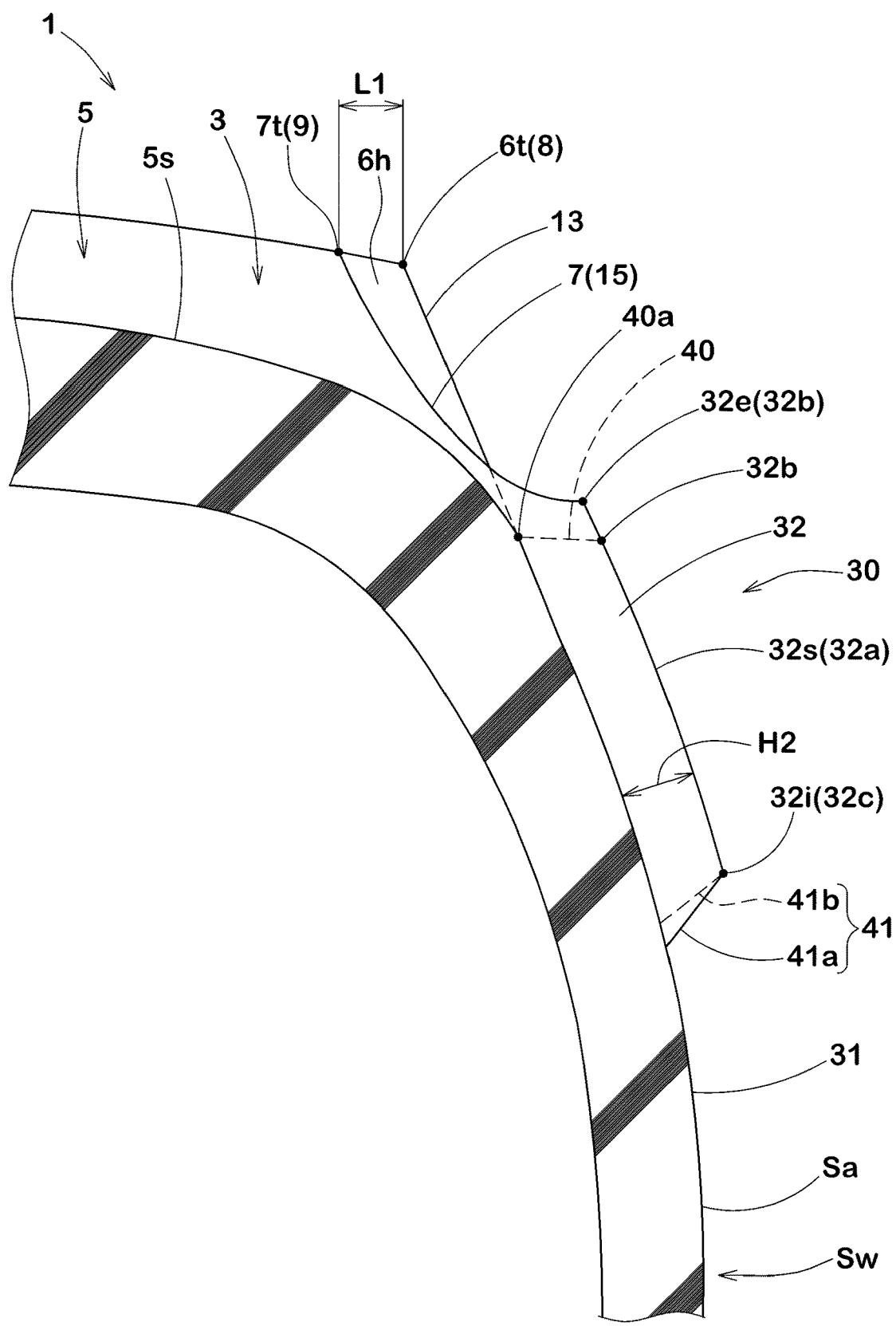
FIG. 7 is a cross-sectional view taken along a line A-A of FIG. 5.
Figure 8:
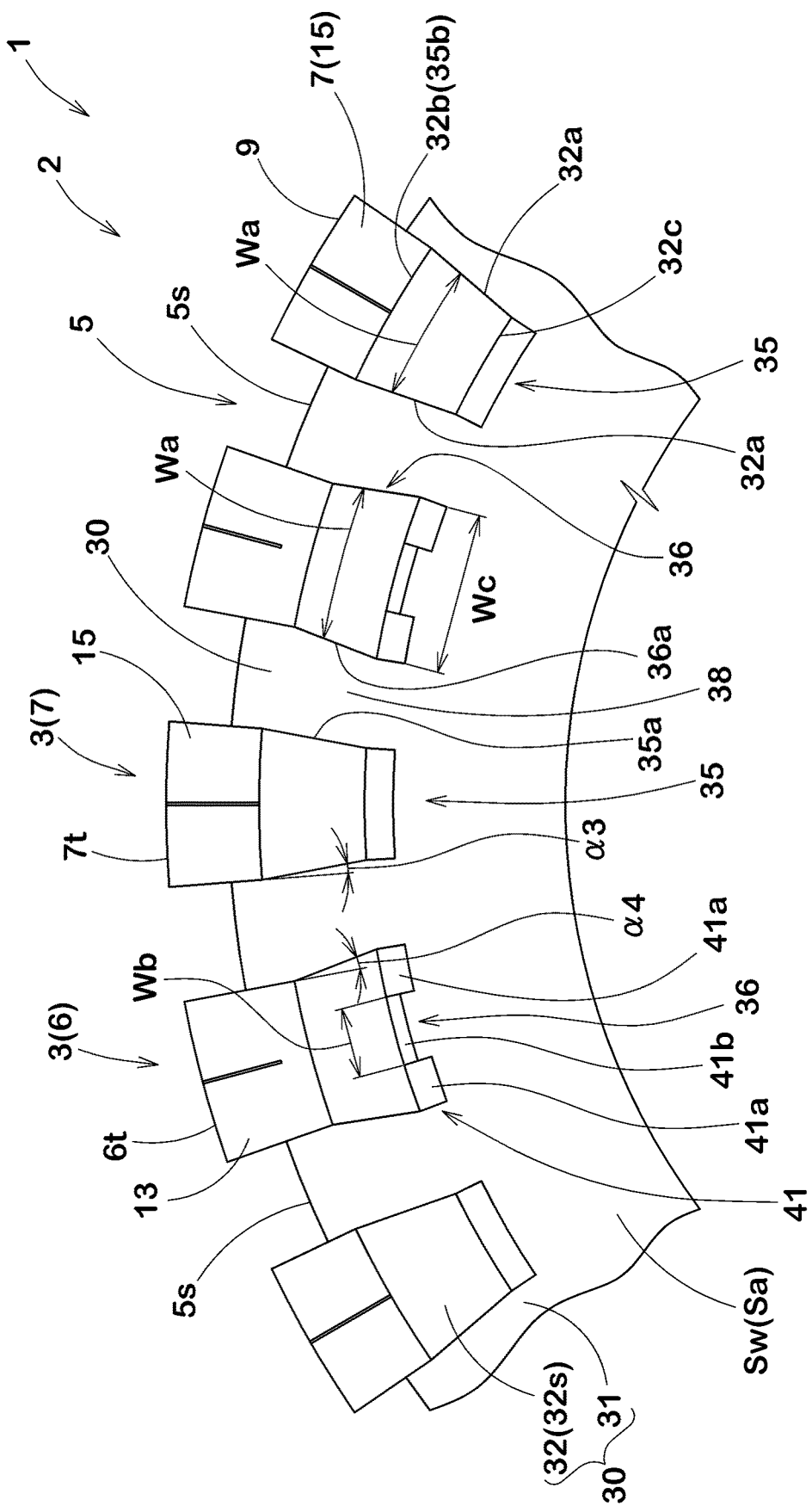
FIG. 8 is a side view of a buttress portion of the tire shown in FIG. 5.

FIG. 7 illustrates a cross-sectional view taken along a line A-A of FIG. 5. FIG. 8 is a side view of the tire 1 of FIG. 1. As illustrated in FIG. 7 and FIG. 8, the tire 1 includes a buttress surface 30 which is a radially outward region of a sidewall portion Sw.

The buttress surface 30 includes a base portion 31 that connects smoothly bottoms 5s of the grooves 5 between shoulder blocks 3 and 3 to an outer surface Sa of the sidewall portion Sw, and a plurality of circumferentially arranged projections 32 protruding axially outwardly from the base portion 31. The projections 32 can generate large traction by contacting with rocks, for example.

Each of the projections 32 includes an outer surface 32s that faces axially outwardly. The outer surface 32s includes a pair of longitudinal edges 32a and 32a extending in the radial direction of the tire, a radially outer circumferential edge 32b extending in the circumferential direction of the tire and a radially inner circumferential edge 32c extending in the circumferential direction of the tire at a location radially inwardly of the outer circumferential edge 32b. In this embodiment, the longitudinal edges 32a and the circumferential edges 32b and 32c extend in a straight shape. Such a projection 32 with high rigidity would generate large traction.

The projections 32 include first projections 35 and second projections 36. Each first projection 35 has a circumferential width decreasing smoothly toward radially inwardly. Since the first projections 35 have a large volume at its radially outer side which is apt to contact with rocks, the first projections 35 can generate large traction. On the other hand, since radially inner sides of the first projections 32 which have less chances to contact with rocks have a relatively small circumferential width Wa, the mass can be lowered. Accordingly, the pneumatic tire 1 in accordance with the present invention can exert an excellent traveling performance on rocky terrain while suppressing increase of the mass to be caused by the projections 32.

The first projections 35 are connected to the side surfaces 15 of the second shoulder block 7 which extend from the second edges 9. High rigidity of the first projections 35 can be ensured by being connected to the second shoulder blocks 7. Furthermore, since the side surfaces 15 of the second shoulder blocks 7 are configured to a concave arc shape as mentioned above, radially outer portions thereof which are apt to contact with rocks have high rigidity so as to generate large traction.

Each second projection 36 has a circumferential width Wa increasing smoothly toward radially inwardly. The second projections 36 and the first projections 35 are arranged alternately in the circumferential direction of the tire. Thus, recesses 38 each of which is inclined with respect to the radial direction of the tire are formed between adjacent first projection 35 and second projection 36. The respective recesses 38 can hold a rock since longitudinal edges 35a of the first projections 35 and longitudinal edges 36a of the second projections 36 generate pressing force to hold the rock based on rotation of the tire.

In order to further improve such an action, angles α3 and α4 of the longitudinal edges 35a of the first projections 35 and the longitudinal edges 36a of the second projections 36, respectively, are equal to or more than 8 degrees with respect to the radial direction of the tire. When the angles α3 and α4 are excessively large, the recesses 38 may not be able to hold a rock effectively. Thus, the angles α3 and α4 are preferably in a range of not more than 12 degrees. Preferably, the longitudinal edges 35a of the first projections 35 and the longitudinal edge 36a of the second projections 36 have the same angle. Alternatively, the longitudinal edges 35a of the first projections 35 and the longitudinal edges 36a of the second projections 36 may have different angles α3 and α4 within the above mentioned range. Note that the angles α3 and α4 are angles at the radially outer circumferential edges 32b.

As illustrated in FIG. 6, each of the second projections 36 includes an outer surface 40 that faces radially outwardly and that has a radially outer circumferential edge 36b, and an inner surface 41 that faces radially inwardly and that has a radially inner circumferential edge 36c. Each outer surface 40 further includes an axially inner edge 40a that extends in parallel with the radially outer circumferential edges 36b.

The second projections 36 are connected to the side surfaces 13 of the first shoulder blocks 6 extending from the first edges 8. Thus, high rigidity of the second projections 36 and the first shoulder blocks 6 are ensured. Furthermore, the side surfaces 13 and the outer surfaces 40 on the first shoulder blocks 6 can contact with rocks in large surface areas. Thus, large traction can be obtained.

As illustrated in FIG. 8, a radially inner portion of each second projection 36 is separated into two. Such a second projection 36 may increase edge components so as to increase chances to contact with rocks, thereby increasing traction. In this embodiment, each inner surface 41 of the second projections 36 includes a pair of circumferentially end portions 41a and 41a arranged on both end sides in the circumferential direction of the tire and a middle portion 41b arranged between the end portions 41a, wherein the middle portion 41b is connected to the base portion 31 at a steeper angle than the end portions 41a. Accordingly, volume of radially inner portions of the second projections 36 tends to be small, and thus the tire mass can be effectively reduced.

In order to ensure rigidity of the second projections 36 while improving the above mentioned effects, circumferential widths Wb of the middle portions 41b are preferably in a range of from 30% to 50% of the circumferential maximum width Wc of the second projections 36.

As illustrated in FIG. 7, the projections 32 preferably have protruding heights H2 in a range of from 5 to 9 mm. When the protruding heights H2 are less than 5 mm, it may not generate large traction since contact surface area to rocks becomes small. When the protruding heights H2 is more than 9 mm, rolling resistance on paved roads may be higher according to increased tire mass.

From the same point of view, radially inner ends 32i of the projections 32 are located in a range of from 60% to 70% a tire sectional height (not illustrated) from the bead base line. Note that radially outer ends 32e (the outer edges) of the projections 32 are located in a range of from 80% to 90% the tire sectional height from the bead base line.

As illustrated in FIG. 1, each central block 4 includes a V-shaped ground contact surface 4a that includes a first inclined portion 25A and a second inclined portion 25B. The first inclined portion 25A extends axially outwardly from the tire equator C and is inclined in one direction with respect to the circumferential direction of the tire. The second inclined portion 25B is inclined in an opposite direction to the first inclined portion 25A, and is greater than the first inclined portion 25A. Note that the shape of each central block 4 is not limited to such an aspect.

In this embodiment, the central blocks 4 on both sides of the tire equator C are arranged in a point symmetrical with respect to an arbitrary point on the tire equator C. Thus, pattern rigidity around the central blocks 4 can be ensured in good balance, and uneven wear resistance can be improved.

A land ratio of the tread portion 2 is preferably in a range of from 45% to 55%. When the land ratio is less than 45%, rigidity of each block 3 and 4 may be lowered, and thus it may be difficult to obtain sufficient traction. When the land ratio is more than 55%, it may be difficult to hold a rock. The land ratio is a ratio of a total area of the ground contact surfaces of the blocks 3 and 4 to an area of virtual ground contact surface of the tread portion 2 which is obtained when the grooves are filled up.

While the particularly preferable embodiments in accordance with the present invention have been described in detail, the present invention is not limited to the illustrated embodiments, but can be modified and carried out in various aspects.

EXAMPLE

First Embodiment

Tires for four-wheel-drive vehicles having a basic tread pattern illustrated in FIG. 1 were manufactured based on details shown in Table 1, and then traveling performance on rocky terrain and uneven wear resistance of each tire was tested. The common specification and test method are as follows.

Tread width TW: 240 mm
Each block height Ha: 17.1 mm
[Traveling Performance on Rocky Terrain]
Each test tire was installed to a four-wheel-drive vehicle with a displacement of 3,600 cc under the following condition. Then, a test driver drove the vehicle on a test course of rocky terrain of a rocky hill to evaluate traction and braking force by the driver's feeling. The test results are shown with a score based on Ref. 1 being 100. The larger the value, the better the performance is.

Tire size: 37×12.50R17
Rim: 9.0JJ
Internal pressure: 100 kPa
[Uneven Wear Resistance]
After the above test traveling, the difference of wear amounts between the long-inclined edge and the short-inclined edge of each shoulder block of all wheels was measured. The measurement was carried out at three positions in the circumferential direction, and then average values thereof were calculated. The test results are evaluated by reciprocals of the average values and are shown with an index based on Ref 1 being 100. The larger the value, the better the performance is.

TABLE 1

Figure 9:
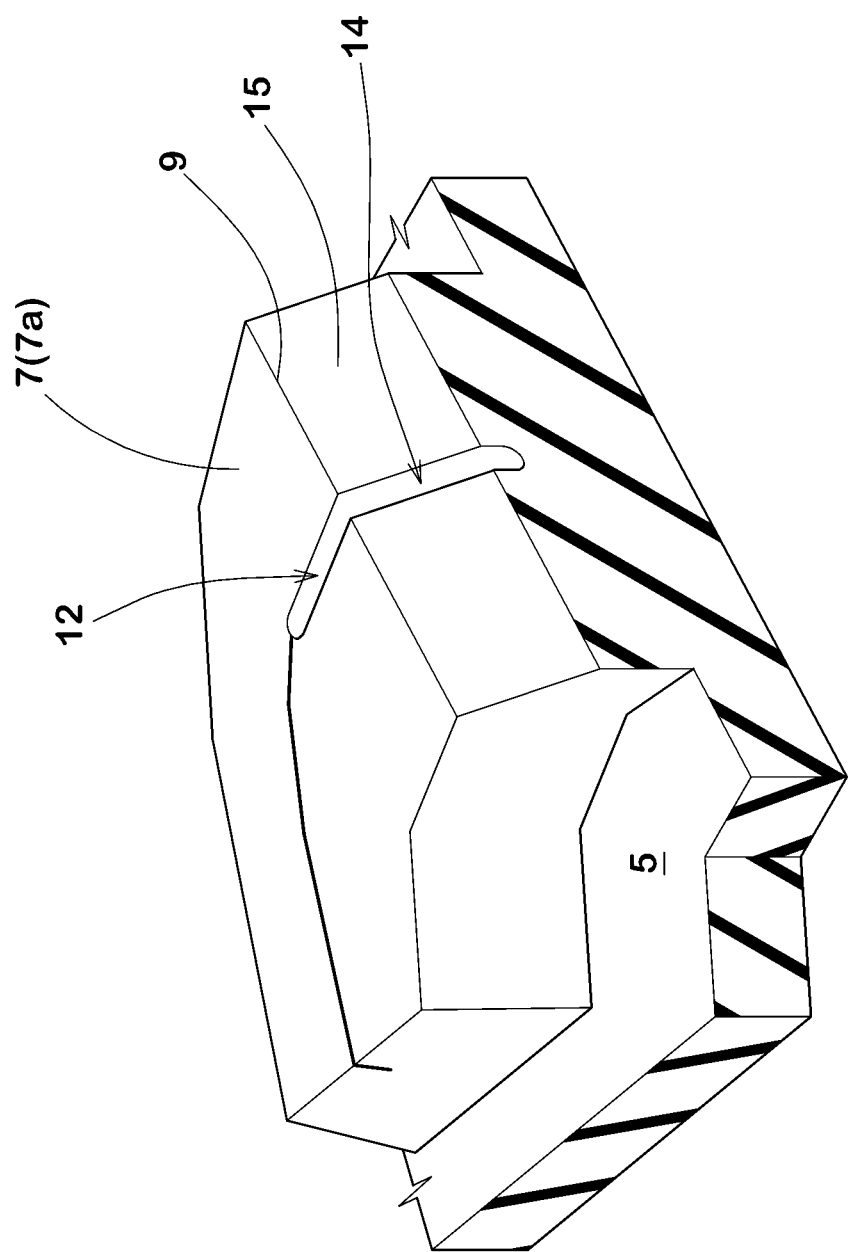
FIG. 9 is a perspective view of a second shoulder block in accordance with another embodiment.
Figure 10:
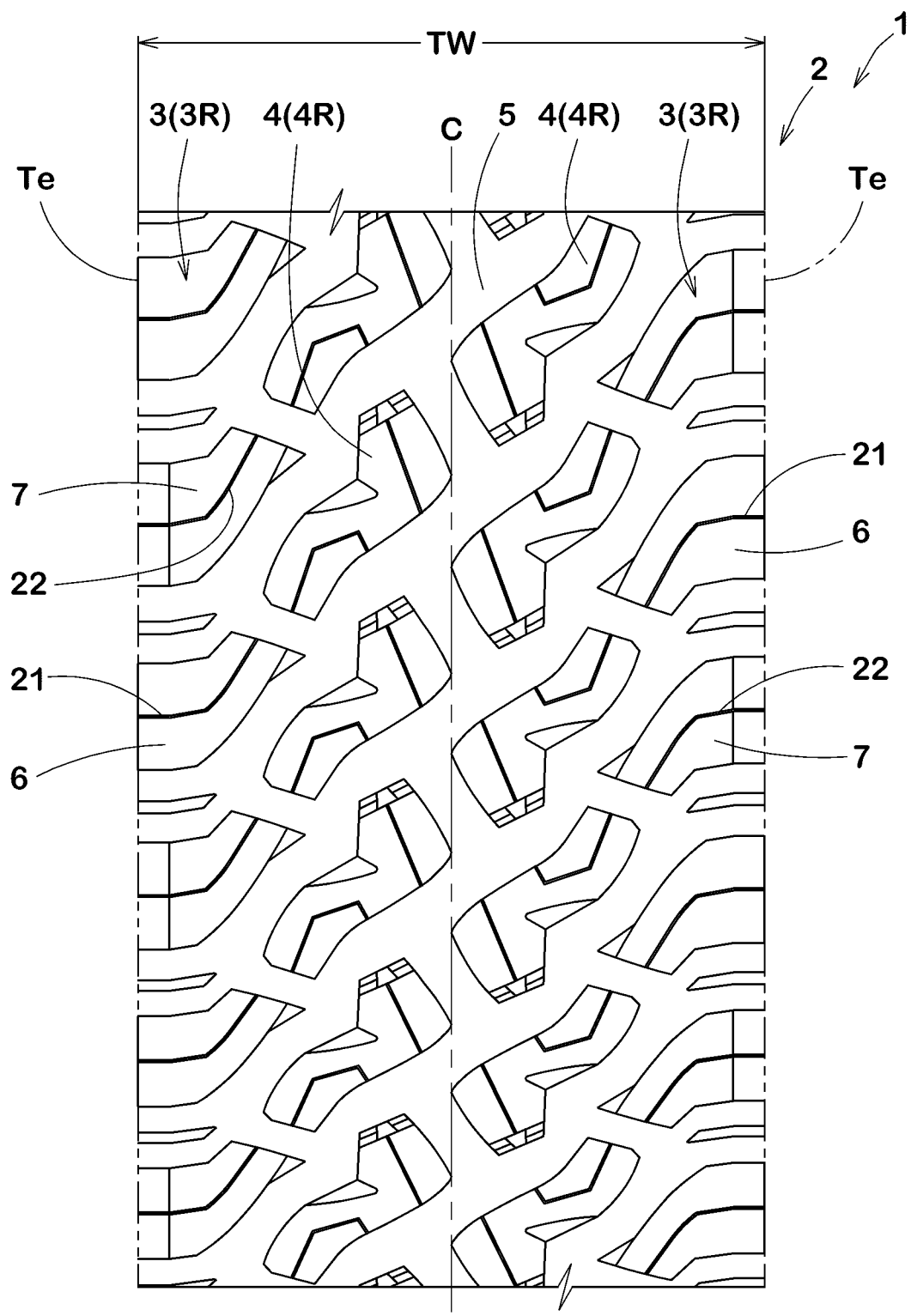
FIG. 10 is a development view of a tread portion in accordance with yet another embodiment.
Figure 11:
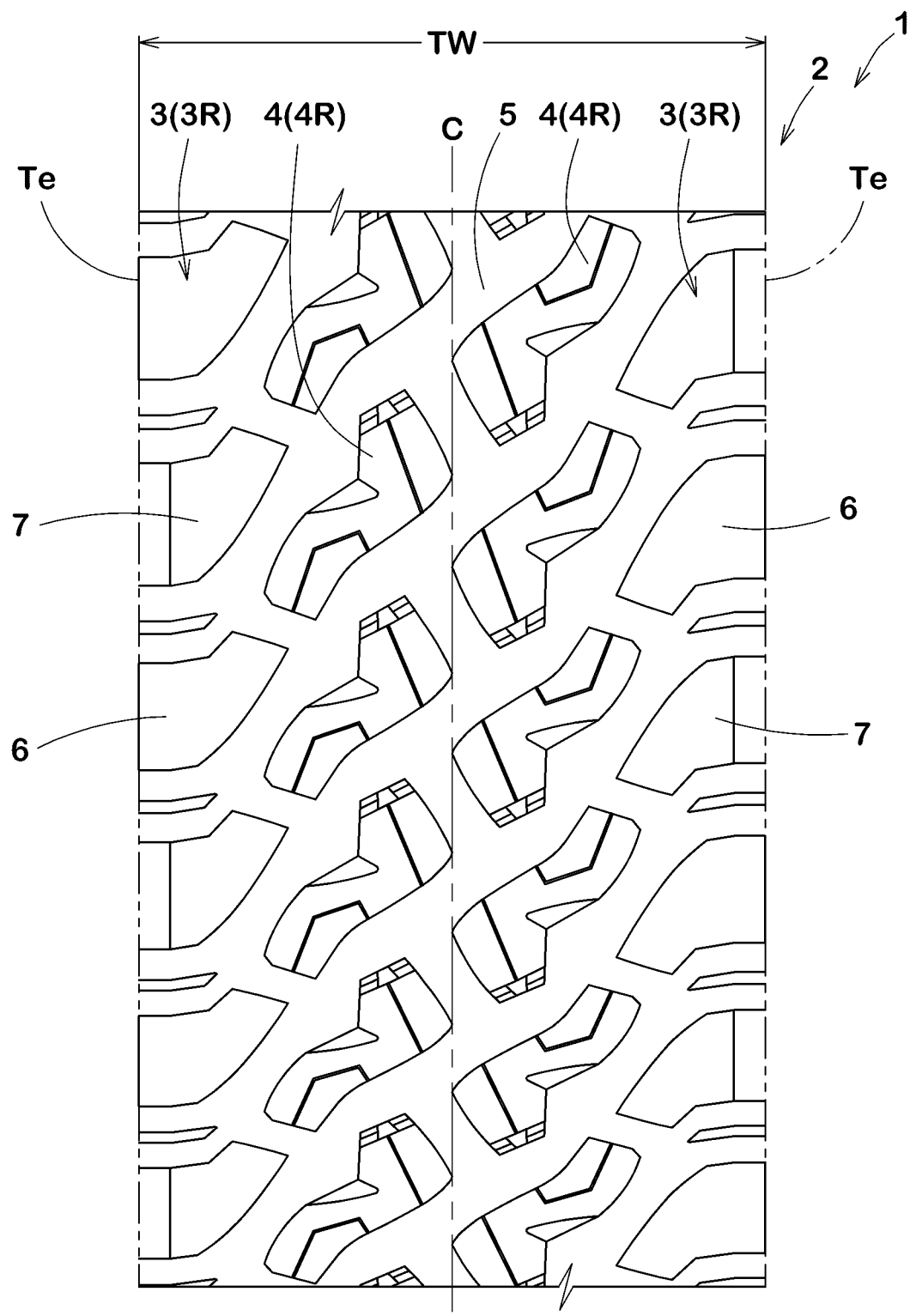
FIG. 11 is a development view of a tread portion in accordance with yet another embodiment.

|  | Ref 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- | --- |
| Figure illustrating tread portion | FIG. 1 | FIG. 10 | FIG. 11 | FIG. 1 | FIG. 1 | FIG. 1 | FIG. 1 | FIG. 1 | FIG. 1 | FIG. 1 | FIG. 1 | FIG. 1 | FIG. 1 |
| Distance between first edge and second edge L/TW (%) | 0 | 5 | 5 | 5 | 3 | 4 | 7 | 8 | 5 | 5 | 5 | 5 | 5 |
| First lug groove | Absence | Absence | Absence | Presence | Presence | Presence | Presence | Presence | Presence | Presence | Presence | Presence | Presence |
| Gentle inclined portion angle θ1 (deg.) | 3 | 3 | 3 | 3 | 3 | 3 | 3 | 3 | 15 | 20 | 3 | 3 | 3 |
| Circumferential pitches of shoulder blocks P/TW (%) | 55 | 55 | 55 | 55 | 55 | 55 | 55 | 55 | 55 | 55 | 40 | 70 | 55 |
| Figure illustrating side surface of first shoulder block | — | FIG. 4 | FIG. 4 | FIG. 4 | FIG. 4 | FIG. 4 | FIG. 4 | FIG. 4 | FIG. 4 | FIG. 4 | FIG. 4 | FIG. 4 | FIG. 9 |
| Traveling performance on rocky terrain [score: larger value means higher evaluation] | 100 | 105 | 107 | 120 | 115 | 118 | 122 | 123 | 118 | 115 | 118 | 122 | 117 |
| Uneven wear resistance [index: larger value means higher evaluation] | 100 | 105 | 102 | 98 | 99 | 98 | 96 | 95 | 98 | 97 | 102 | 97 | 97 |

From the test results, it is confirmed that the example tires, as compared with the reference tires, improve traveling performance on rocky terrain while ensuring uneven wear resistance. Also, the similar results were obtained in another test using tires having different tire size to the above.

Second Embodiment

Tires for four-wheel-drive vehicles having a basic tread pattern illustrated in FIG. 5 were manufactured based on details shown in Table 2, and then traveling performance on rocky terrain and tire mass was tested. The common specification and test method are as follows.

Tread width TW: 240 mm
Each block height Ha: 17.1 mm
[Traveling Performance on Rocky Terrain]
Each test tire was installed to a four-wheel-drive vehicle with a displacement of 3,600 cc under the following condition. Then, a test driver drove the vehicle on a test course of rocky terrain of a rocky hill to evaluate traveling performance regarding traction by the driver's feeling. The test results are shown with a score based on Ex. 1 being 100. The larger the value, the better the performance is.

Tire size: 37×12.50R17
Rim: 9.0JJ
Internal pressure: 100 kPa
Locations of inner ends of projections: radial heights of inner ends of projections from bead base line/tire sectional height
[Tire Mass]
Each tire mass was measured. The test results are shown with an index based on Ex. 1 being 100. The smaller value means higher evaluation.

TABLE 2

Figure 12:
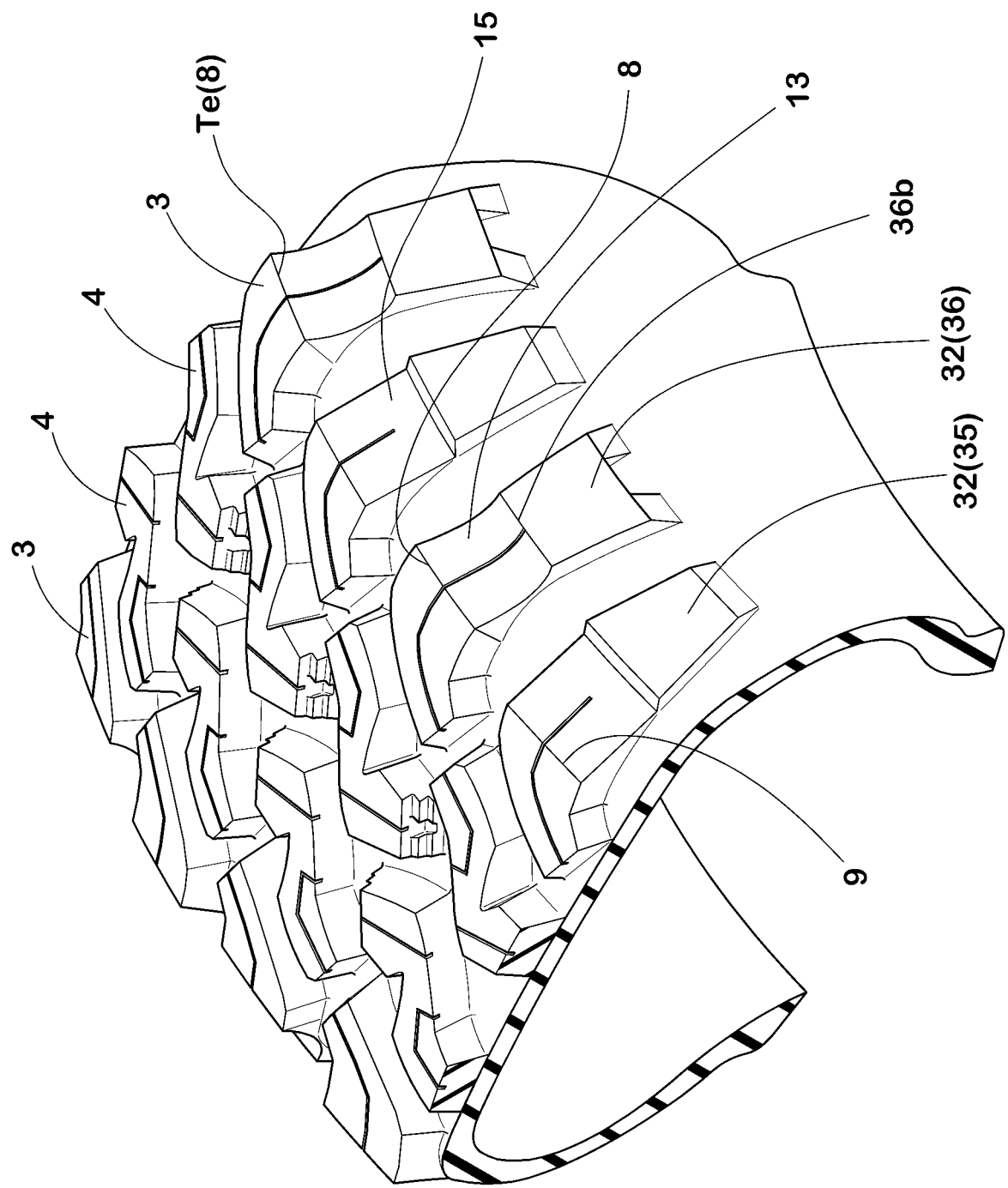
FIG. 12 is a perspective view of a tire in accordance with yet another embodiment.

|  | Ex. 21 | Ex. 22 | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|
| Figure illustrating buttress portion | FIG. 6 | FIG. 6 | FIG. 6 | FIG. 6 | FIG. 6 | FIG. 6 | FIG. 6 | FIG. 6 | FIG. 6 | FIG. 6 | FIG. 12 |
| Longitudinal edge angles α3 of first projections (deg.) | 0 | 10 | 6 | 8 | 12 | 14 | 10 | 10 | 10 | 10 | 10 |
| Longitudinal edge angles α4 of second projections (deg.) | 0 | 10 | 6 | 8 | 12 | 14 | 10 | 10 | 10 | 10 | 10 |
| Projecting heights H2 of projections (mm) | 7 | 7 | 7 | 7 | 7 | 7 | 4 | 10 | 7 | 7 | 7 |
| Locations of inner ends 32i of projections (%) | 65 | 65 | 65 | 65 | 65 | 65 | 65 | 65 | 58 | 72 | 65 |
| Traveling performance on rocky terrain [score: larger value means higher evaluation] | 100 | 115 | 107 | 110 | 110 | 107 | 105 | 108 | 104 | 109 | 106 |
| Tire mass [index: smaller value means higher evaluation] | 100 | 100 | 100 | 100 | 100 | 100 | 98 | 102 | 97 | 103 | 100 |

From the test results, it is confirmed that the example tires that satisfy a preferred range of each parameters improve traveling performance on rocky terrain while preventing increasing of tire mass, as compared with the reference tires that do not satisfy the preferred range of each parameters. Also, the similar results were obtained in another test using tires having different tire size to the above.

REFERENCE SIGNS LIST

2 Tread portion
3 Shoulder block
3R Shoulder block row
6 First shoulder block
6a Ground contact surface
7 Second shoulder block
7a Ground contact surface
8 First edge
9 Second edge

The invention claimed is:
1. A pneumatic tire comprising:
a tread portion being provided with a shoulder block row comprising a plurality of circumferentially arranged shoulder blocks on at least one side of tread edges;
the shoulder blocks comprising a first shoulder block and a second shoulder block alternately arranged in a circumferential direction of the tire;
the first shoulder block comprising a first edge defining an axially outermost ground contact edge of its ground contact surface, and a first long-inclined edge extending from one of circumferential ends of the first edge with an inclination with respect to a tire axial direction, wherein
the first shoulder block is provided with a first lug groove extending axially inwardly from the first edge and terminating within the first shoulder block and a first sipe extending axially inwardly from an axially inner end of the first lug groove,
the first sipe extends in parallel with at least a portion of the first long-inclined edge,
a width of the first sipe is less than 1.0 mm,
a groove width of the first lug groove is in a range of from 3.0 to 8.0 mm;
the second shoulder block comprising a second edge defining an axially outermost ground contact edge of its ground contact surface, the second edge being located axially inwardly of the first edge,
the first lug groove comprises:
a first axial portion extending from the first edge along an axial direction of the tire; and
a first inclined portion connected to the first axial portion and extend from an end of the first axial portion with a first inclination with respect to the axial direction of the tire, and
the second lug groove comprises:
a second inclined portion extending from the second edge with a second inclination with respect to the axial direction of the tire.
2. The pneumatic tire according to claim 1,
wherein the first inclined portion has an angle of from 10 to 15 degrees with respect to the axial direction of the tire.
3. The pneumatic tire according to claim 1,
wherein the first edge is apart from the second edge at an axial distance of from 4% to 7% of a tread width.
4. The pneumatic tire according to claim 1,
wherein the second shoulder block is provided with a second lug groove extending axially inwardly from the second edge and terminating within the block.
5. The pneumatic tire according to claim 4,
wherein the second lug groove consists of an inclined portion extending axially inwardly from the second edge at an angle of not more than 15 degrees with respect to an axial direction of the tire.
6. The pneumatic tire according to claim 4,
wherein an axially inner end of the second lug groove is provided at the same location as an axially inner end of the first lug groove in an axial direction of the tire.
7. The pneumatic tire according to claim 1,
wherein the tire further comprises a buttress surface which is a radially outward region of a sidewall portion, in a tire meridian cross-sectional view including a tire rotational axis under a standard condition such that the tire is mounted on a standard wheel rim with a standard pressure, but is loaded with no tire load, the buttress surface is provided with a plurality of circumferentially arranged projections protruding axially outwardly,
the projections comprise a first projection having a circumferential width decreasing smoothly toward radially inwardly,
the second shoulder block comprises a side surface extending radially inwardly and axially outwardly from the second edge, and
the first projection is connected to the second edge through the side surface of the second shoulder block.

8. The pneumatic tire according to claim 7,
wherein the projections further comprise a second projection having a circumferential width increasing smoothly toward radially inwardly, and
the first projection and the second projection are arranged alternately in the circumferential direction of the tire.

9. The pneumatic tire according to claim 8,
wherein the second projection comprises a circumferentially extending outer surface facing radially outwardly, and
the second projection is connected to the first edge through an outer surface of the first shoulder block.

10. The pneumatic tire according to claim 9,
wherein in a tire meridian cross-sectional view including a tire axis, the outer surface of the first shoulder block is configured to a convex shape toward axially outwardly, or a straight shape.

11. The pneumatic tire according to claim 8,
wherein a radially inner portion of the second projection is separated into two.

12. The pneumatic tire according to claim 7,
wherein the projections comprise a pair of radially extending longitudinal edges, and angles of the longitudinal edges are in a range of from 8 to 12 degrees with respect to a radial direction of the tire.

13. The pneumatic tire according to claim 7, wherein protruding heights of the projections are in a range of from 5 to 9 mm.

14. The pneumatic tire according to claim 7,
wherein radially inner ends of the projections are located in a range of from 60% to 70% a tire sectional height from a bead base line.

15. The pneumatic tire according to claim 1, wherein the first sipe connects the axially inner end of the first lug groove and an axially first inner edge of the first shoulder block.

16. The pneumatic tire according to claim 4, wherein a groove width of the second lug groove is in a range of from 3.0 to 8.0 mm.

17. The pneumatic tire according to claim 16, wherein the second shoulder block is provided with a second sipe connecting an axially inner end of the second lug groove and an axially second inner edge of the second shoulder block, and wherein a width of the second sipe is less than 1.0 mm.

18. The pneumatic tire according to claim 1, wherein a portion of the ground contact surface of the first shoulder block located axially inwardly of the second edge of the second shoulder block is same as a ground contact surface of the second shoulder block.

19. A pneumatic tire comprising:
a tread portion being provided with a shoulder block row comprising a plurality of circumferentially arranged shoulder blocks on at least one side of tread edges;
the shoulder blocks comprising a first shoulder block and a second shoulder block alternately arranged in a circumferential direction of the tire;
the first shoulder block comprising a first edge defining an axially outermost ground contact edge of its ground contact surface, a first long-inclined edge extending from one of circumferential ends of the first edge with an inclination with respect to a tire axial direction, and a first inner edge extending from an axially inner end of the first long-inclined edge with an opposite inclination to that of the first long-inclined edge, wherein:
the first shoulder block is provided with a first lug groove extending axially inwardly from the first edge and terminating within the first shoulder block and a first sipe extending from an axially inner end of the first lug groove to the first inner edge,
a width of the first sipe is less than 1.0 mm, and
a groove width of the first lug groove is in a range of from 3.0 to 8.0 mm; and
the second shoulder block comprising a second edge defining an axially outermost ground contact edge of its ground contact surface, the second edge being located axially inwardly of the first edge, and
wherein an axial distance between an axial inner end of the first lug groove and the tread edge equals to an axial distance between an axial inner end of the second lug groove and the tread edge, and the axially inner end of the second lug groove is provided at the same location as the axially inner end of the first lug groove in the axial direction of the tire.

20. A pneumatic tire comprising:
a tread portion being provided with a shoulder block row comprising a plurality of circumferentially arranged shoulder blocks on at least one side of tread edges;
the shoulder blocks comprising a first shoulder block and a second shoulder block alternately arranged in a circumferential direction of the tire;
the first shoulder block comprising a first edge defining an axially outermost ground contact edge of its ground contact surface, and a first long-inclined edge extending from one of circumferential ends of the first edge with an inclination with respect to a tire axial direction, wherein
the first shoulder block is provided with a first lug groove extending axially inwardly from the first edge and terminating within the first shoulder block and a first sipe extending axially inwardly from an axially inner end of the first lug groove, the first sipe extends in parallel with at least a portion of the first long-inclined edge,
a width of the first sipe is less than 1.0 mm,
a groove width of the first lug groove is in a range of from 3.0 to 8.0 mm;
the second shoulder block comprising a second edge defining an axially outermost ground contact edge of its ground contact surface, the second edge being located axially inwardly of the first edge,
wherein the first lug groove comprises an axial portion extending from the first edge along an axial direction of the tire and an inclined portion connected to the axial portion and having an angle of from 10 to 15 degrees with respect to the axial direction of the tire.

* * * * *